United States Patent
Layman et al.

(10) Patent No.: US 9,071,459 B2
(45) Date of Patent: Jun. 30, 2015

(54) METHODS AND SYSTEMS FOR ESTABLISHING ELECTRONIC COMMUNICATIONS IN A HOSTED VOIP PBX USING TWO TIERED LOAD BALANCING

(75) Inventors: Randy Layman, Marietta, GA (US); Robert Michael Smith, Atlanta, GA (US); Jonathan Alexander, Roswell, GA (US)

(73) Assignee: VONAGE BUSINESS SOLUTIONS, INC., Atlanta, GA (US)

( * ) Notice: Subject to any disclaimer, the term of this patent is extended or adjusted under 35 U.S.C. 154(b) by 277 days.

(21) Appl. No.: 13/590,140

(22) Filed: Aug. 20, 2012

(65) Prior Publication Data

US 2014/0050083 A1     Feb. 20, 2014

(51) Int. Cl.
*H04M 7/00* (2006.01)
*H04M 3/51* (2006.01)
*H04L 12/54* (2013.01)
*H04L 12/803* (2013.01)
*H04L 29/06* (2006.01)
*H04W 36/14* (2009.01)

(52) U.S. Cl.
CPC .............. *H04L 12/56* (2013.01); *H04L 47/125* (2013.01); *H04L 65/1053* (2013.01); *H04L 65/80* (2013.01)

(58) Field of Classification Search
CPC . H04M 7/0003; H04M 3/5183; H04W 36/14; H04L 67/1029; H04L 47/125; H04L 45/46; H04L 67/1031
USPC .................................................. 370/229–235
See application file for complete search history.

(56) References Cited

U.S. PATENT DOCUMENTS

| | | |
|---|---|---|
| 2009/0183167 A1 | 7/2009 | Kupferschmidt et al. |
| 2010/0232594 A1* | 9/2010 | Lawson et al. ........... 379/220.01 |
| 2011/0255675 A1* | 10/2011 | Jasper et al. ............... 379/112.1 |

OTHER PUBLICATIONS

IEEE Paper 2010: Two-tier Multi-tenancy Scaling and Load Balancing.
IEEE Paper 2007: Two-Tier Load Balancing in OSPF Wireless Back-Hauls.
Radware SIP Director for VoIP Load Balancing, Radware.com/Resources/voip_load_balancing.aspx, 2012, p. 1 of 1.

(Continued)

Primary Examiner — Xavier S. Wong
(74) Attorney, Agent, or Firm — Alexander Legal LLC; Joseph Pagnotta

(57) ABSTRACT

A system and method is provided for two-tiered load balancing on a hosted voice-over Internet protocol (VoIP) private branch exchange (PBX). The system includes a plurality of client devices, at least one device load balancer, and at least one call load balancer. The device load balancer identifies a device group to which each client device belongs; and a cluster of computing resources for processing calls for the device group. The cluster is assigned to the device group based on prescribed conditions. In response to a communications request, call load balancers in communication with the device load balancers dynamically determine if predefined conditions are currently being met within an identified cluster of computing resources. If the predefined conditions are currently being met, then the communications request for a primary client device associated with the request is established via one of a plurality of server nodes within the cluster of computing resources.

28 Claims, 4 Drawing Sheets

(56) References Cited

OTHER PUBLICATIONS

Brekeke SIP Server with SIP/VoIP Load Balancing, brekeke.com/sip/sip-server_load-balancing.php, 2012, pp. 1-2.
Voice over IP Networks: Managing the SIP Protocol With Link Balancers, www.elfiq.com, Dec. 2008, Elfiq Networks, Elifq Inc., pp. 3-6.
Enterprise Deployment UltraMonkey, wiki.freeswitch.org/wiki/Enterprise_deployment_UltraMonkey, Oct. 1.

* cited by examiner

METHODS AND SYSTEMS FOR ESTABLISHING ELECTRONIC COMMUNICATIONS IN A HOSTED VOIP PBX USING TWO TIERED LOAD BALANCING

FIELD OF THE INVENTION

The present invention relates generally to Voice-over-Internet-Protocol (VoIP) and Session Initiation Protocol (SIP) electronic communications and, more particularly, to methods and systems for establishing an optimized, electronic communication in a hosted VoIP private branch exchange (PBX) having limited and finite computing resources by using two-tiered load balancing techniques.

BACKGROUND OF THE INVENTION

Load balancing solutions currently exist that are used for Voice-over-Internet-Protocol (VoIP) and Session Initiation Protocol (SIP) systems. Traditional load balancing solutions in this industry allow communications to be distributed across an available group of computing resources or servers so that each computing resource or server of the group handles a similar or equal amount of activity. This kind of solution typically relies on a standard load balancer, which is one node or a cluster of nodes that acts as a proxy for communications. The load balancer serves as a traffic director that relies upon configurable logic for distributing the communication activity to the group of available computing resources or servers. Many types of load balancing solutions exist for a variety of systems and such solutions often include hardware-based solutions, software-based solutions, or some combination of both hardware-based and software-based solutions.

The requirements of a hosted VoIP private branch exchange (PBX) have created the need for a new kind of load balancing solution, one that goes beyond previous systems and techniques to optimize the reliability and quality of VoIP communications and the performance of PBX features. Pre-existing load balancing solutions lack critical features to balance communications in a way that can significantly increase the reliability of good VoIP call quality from a limited set of computing resources and are not designed to balance communications in a way that facilitates PBX optimizations for intra-group communications like call transfers and conference calls. An improved load balancing solution for hosted VoIP PBX would provide a way to increase the reliability of VoIP quality of service and increase the efficiency of intra-group communications while balancing the load of electronic communications across a limited set of computing resources or servers in such a way that also protects against unforeseen load increases or spikes in demand.

The present invention meets one or more of the above-referenced needs as described herein in greater detail.

SUMMARY OF THE INVENTION

The present invention relates generally to Voice-over-Internet-Protocol (VoIP) and Session Initiation Protocol (SIP) electronic communications and, more particularly, to methods and systems for establishing optimized, electronic communications in hosted VoIP private branch exchange (PBX) systems having limited and finite computing resources by using two-tiered load balancing techniques. Briefly described, aspects of the present invention include the following.

In a first aspect of the present invention a method for providing two-tiered load balancing for a hosted voice-over Internet protocol (VoIP) private branch exchange (PBX) is described. The hosted VoIP PBX includes a plurality of VoIP-enabled client devices and employs one or more device load balancers as well as one or more call load balancers within the hosted VoIP PBX and in communication with the plurality of VoIP-enabled client devices. The device load balancers perform the steps including identifying a specific group to which each client device belongs among a plurality of client device groups. Next the device load balancers dynamically identify a selected cluster of computing resources to which an identified specific group of client devices are assigned, from among a plurality of clusters. The assignment of the specific group of client devices to the selected cluster of computing resources is based on prescribed conditions, and wherein each cluster of computing resources includes a plurality of server nodes. Therefore, in response to a communication request to and/or from a primary client device, the device load balancer identifies the specific group of client devices with which the primary client device is assigned and then identifies the selected cluster of computing resources assigned to the specific group of client devices with which the primary client device is assigned. A communication request associated with the primary client device is initially routed to the identified cluster of computing resources that is assigned to the specific group of client devices with which the primary client device belongs.

Further within the first aspect of the invention, one or more call load balancers are employed within the hosted VoIP PBX and in communication with the one or more device load balancers and with the plurality of client devices. The call load balancers dynamically determine if predefined conditions are currently being met within the identified selected cluster of computing resources. If the predefined conditions are currently being met, then the communication request associated with the primary client device is established via an available one of the plurality of server nodes within the selected cluster of computing resources.

In a second aspect of the present invention, a system for two-tiered load balancing for a hosted voice-over Internet protocol (VoIP) private branch exchange (PBX) is provided. The system comprises a plurality of VoIP-enabled client devices in communication with the hosted VoIP PBX, wherein each client device is assigned to an associated group of client devices. The system includes a first data storage accessible by the hosted VoIP PBX that identifies the associated group of client devices to which each of the plurality of client devices is assigned. The system also employs a plurality of clusters of computing resources in communication with the hosted VoIP PBX, wherein each cluster of computing resources includes a plurality of server nodes, wherein each of the server nodes is adapted to handle calls to and from the plurality of client devices in communication with the hosted VoIP PBX.

Further in the second aspect of the present invention, at least one device load balancer is employed by the hosted VoIP PBX for identifying each group of client devices that is associated with one of the plurality of clusters of computing resources, wherein each associated group of client devices is assigned to a specific cluster among the plurality of clusters based on prescribed conditions.

In an embodiment of a second aspect of the present invention, the hosted VoIP PBX accesses a second data storage for identifying the specific cluster to which an associated group of client devices is assigned. Further, at least one call load balancer is in electronic communication with at least one device load balancer and one or more of the plurality of clusters of computing resources. In response to a specific communication request to or from a primary client device, the at least one device load balancer performs the steps of: (a) first identifying the associated group of client devices with which the primary client device is assigned based on data obtained from the first data storage; (b) next, the at least one device load balancer identifies the specific cluster of computing resources assigned to the associated group of client devices with which the primary client device is assigned based on data obtained from the second data storage; and (c) the at least one device load balancer initially routes a specific communication request associated with the primary client device to the identified specific cluster. Next the at least one call load balancer (d) dynamically determines if predefined conditions are currently being met within the identified specific cluster; and (e) if the predefined conditions are currently being met, it then establishes the call request associated with the primary client device with an available one of the plurality of server nodes within the identified specific cluster of computing resources.

A third aspect of the invention includes a two-tier load balancing system for a server-based voice-over Internet protocol (VoIP) private branch exchange (PBX), comprising a plurality of VoIP-enabled client devices in communication with the server-based VoIP PBX, wherein each of the plurality of client devices is assigned to an associated group of client devices based on a logical relationship among the plurality of client devices assigned to the associated group of client devices. A first data storage accessible by the server-based VoIP PBX identifies the associated group to which each of the plurality of client devices is assigned. A plurality of clusters of computing resources wherein each cluster of computing resources includes a plurality of server nodes, wherein each of the server nodes is adapted to handle calls to and from the plurality of client devices. A device load balancer is adapted to intercept all communications associated with the plurality of client devices handled by the server-based VoIP PBX. The device load balancer routes communications to and from one or more associated groups of client devices, wherein, in response to a specific communication initiation request associated with a specific client device within the associated group of client devices, the device load balancer identifies a specific cluster of servers for processing the communication initiation request associated with the specific client device within the associated group of client devices. The specific cluster of servers is selected based on prescribed conditions, and wherein the device load balancer then assigns all future communications to or from the associated group of client devices to the selected specific cluster of servers.

Further to the third aspect of the invention, a call loadbalancer associated with the selected specific cluster of servers is adapted dynamically to monitor current conditions and thresholds within the cluster of servers to determine if predefined conditions are being met. If the predefined conditions are not being met the call load balancer my send a distress signal or flag to the device load balancer to reject an incoming communications request and/or to reroute future incoming communications requests to a different cluster of servers.

In another aspect of the invention the predefined conditions referenced by the call load balancer include both (1) ensuring that a maximum number of simultaneous communications permitted for the specific group of client devices is not currently being exceeded and (2) ensuring that minimum quality of service conditions being provided by the selected cluster of computing resources assigned to the specific group of client devices is currently being maintained. In a further aspect of the invention, the minimum quality of service conditions determined by the call load balancer's predefined conditions include at least one qualitative metric.

In an aspect of the invention, each of the plurality of server nodes is capable of handling communications to and from the plurality of client devices within the hosted VoIP PBX. In another aspect of the invention, each specific group of client devices includes client devices logically associated with each other. The logical association of client devices can include client devices that belong to a set of users that frequently interact, that are part of a common business entity, that need to share similar PBX functionality, and/or that are physically proximate to each other.

In an aspect of the invention, each of the one or more call load balancers in communication with the selected cluster of computing resources shares the same logic and condition thresholds. If the predefined conditions within the selected cluster of computing resources are not currently being met, then the call load balancer sends a distress signal or flag to the device load balancer indicating that a specific node or the selected cluster of computing resources is not currently meeting the predefined conditions. This would allow the device load balancer to reject the communication request or hand it off to a different cluster of computing resources or server node.

The aspects of the invention also encompasses a computer-readable medium having computer-executable instructions for performing methods of the present invention, and computer networks and other systems that implement the methods of the present invention.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
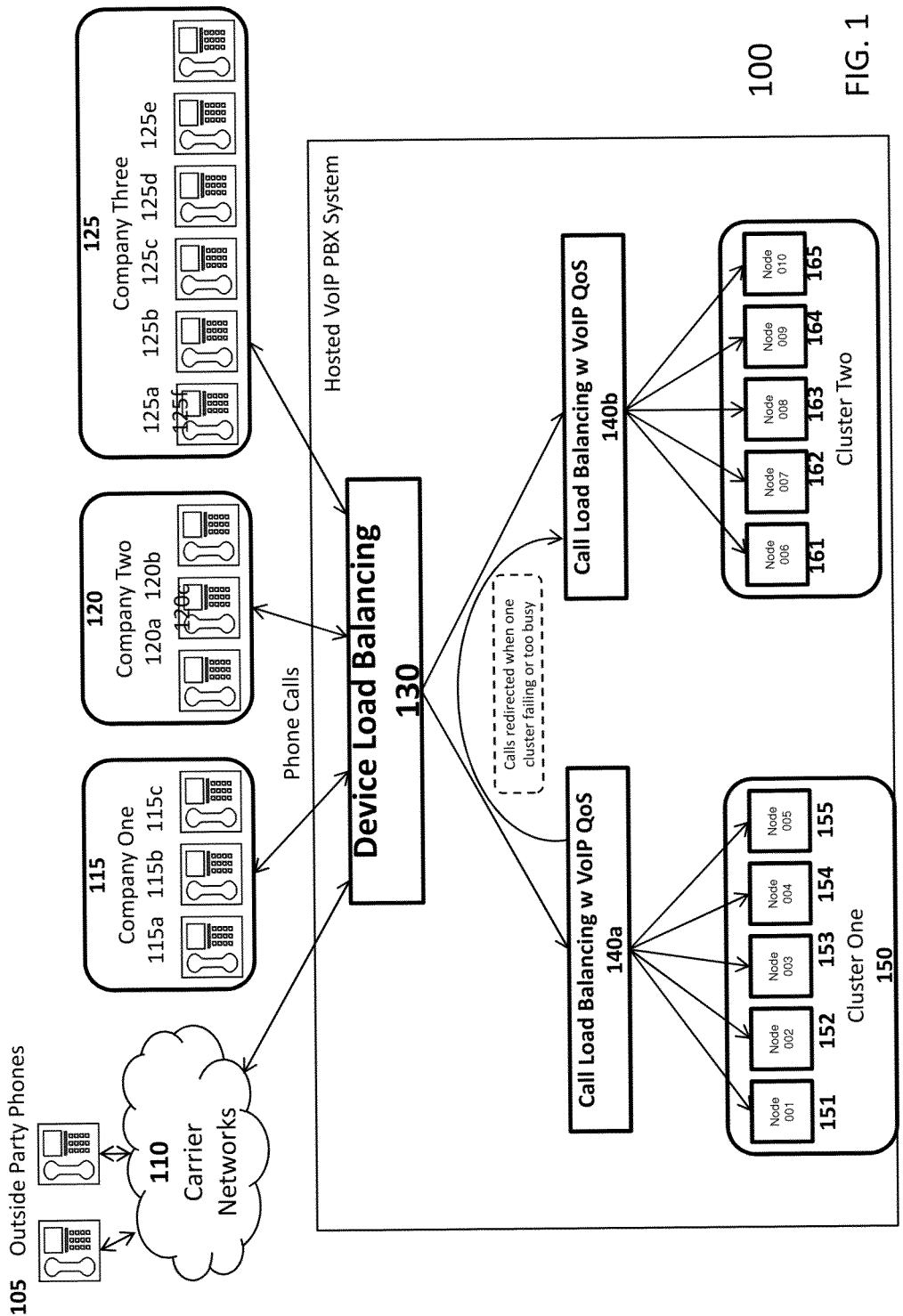
FIG. 1 is a block diagram of an implementation of a two-tier load balancing system for hosted VoIP PBX.

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutations of these can not the explicitly disclosed, each is specifically contemplated and described herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 4 below.

Embodiments of the methods and systems are described below with reference to block diagrams and flowchart illustrations of methods, systems, apparatuses and computer program products. It will be understood that each block of the block diagrams and flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary system in which the present methods and sub-system can operate. The present disclosure relates to methods and systems for providing two-tiered load balancing for a hosted voice-over Internet protocol (VoIP) private branch exchange (PBX), wherein the hosted VoIP PBX includes managing communications among a plurality of VoIP-enabled client devices. Those skilled in the art will appreciate that present methods may be used in systems that employ both digital and analog equipment. One skilled in the art will also appreciate that provided herein is a functional description and that the respective functions can be performed by software, hardware, or a combination of software and hardware.

As shown, the two-tier load balancing system is preferably implemented for all Session Initiation Protocol (SIP) and Voice-over-Internet Protocol (VoIP) communications handled by a hosted VoIP private branch exchange (PBX) system. The load balancing system allows the hosted VoIP PBX system to provide optimized service features and reliable VoIP quality to end users while making efficient use of limited computing resources. The load balancing system favors the even distribution of available computing resources to each client device (i.e., each SIP client capable of making or receiving VoIP calls and each logical client device capable of receiving or forwarding VoIP calls) over the completely even distribution of communications across computing resources, meaning that idle devices may be allocated the same amount of computing resources as busy devices. The load balancing system can also enforce limits on the computing resources consumed by each client device or each identified group of client devices. The load balancing system also favors the quality of each communication handled rather than ensuring the establishment of every communication, meaning that the initiation of a new communication may be rerouted or even rejected if the load balancing system logic identifies that the new communication may not be handled with sufficient quality.

The hosted VoIP PBX system consists of computing resources that are capable of handling SIP and VoIP communications called nodes. These nodes may have a variety of SIP and VoIP handling software, a variety of resource configurations, and the underlying systems may be physical or virtual. All nodes are essentially equal in their ability to handle SIP and VoIP communications, however different nodes may have different software or hardware configurations and different amounts of computing resources, such as different types of CPUs or different types or amounts of memory. As explained previously, some nodes may be physical machines and some nodes may be virtual machines, and different nodes may run different versions of specific software modules.

Within the hosted VoIP PBX system, the nodes are organized into groups called clusters. Each cluster contains one or more nodes, and different clusters may have a different number of nodes. Clusters may be located in the same or separate physical locations.

FIG. 1 illustrates the hosted VoIP PBX system 100, which has a set of client devices 115(*a-c*), 120(*a-c*), 125(*a-f*) that are the known and registered clients of the system 100. These devices may be actual SIP clients, or they may be logical client devices associated with a specific entity known to the Hosted VoIP PBX system 100 that is capable of receiving calls, such as a direct inward dialing number (DID), a user device, a voice mailbox, a conference bridge, or other such entities. When a client device 115*a*-125*f* is used to place outbound calls, the SIP communications and VoIP communications from the device are sent to the hosted VoIP PBX system 100, which then initiates, routes and connects the outbound call appropriately. These client devices 115*a*-125*f* may have Direct Inward Dialing (DID) numbers assigned to them, in which case other devices may dial the DID of the device, the incoming call will be sent (via integrated carriers) to the hosted VoIP PBX system 100, which then initiates, routes and connects the inbound call to the associated client device 115*a*-125*f*. Client devices may also perform other functions using SIP or VoIP communications to the hosted VoIP PBX system, such as putting a call on hold, transferring a call, or invoking other system capabilities. Inbound and outbound calls may also be initiated in other ways, including through other user interfaces or integration with other software applications in which the user may, for example, click a button to initiate a call. Calls may also be initiated through other call routing techniques defined within the hosted VoIP PBX system for example, when a caller uses a dial-by-name directory to find a user and then the hosted VoIP PBX system 100 routes the incoming call to the user's client device 115*a*-125*f*.

Further illustrated in FIG. 1, the hosted VoIP PBX system 100 provides PBX functionality for organizations using VoIP calling and VoIP phones via client devices 115*a*-125*f*. For a hosted VoIP PBX system 100 with two-tier load balancing as described herein, all client devices 115*a*-125*f* are preferably assigned to one and only one device group, which is illustrated in the figures as, for example, Company One 115, Company Two 120 and Company Three 125, wherein each device group contains, respectively, client devices 115*a*-115*c*; 120*a*-120*c*; and 125*a*-125*f*. The set of client devices 115*a*-125*f* in device groups 115, 120, 125 are representative of the entire set of client devices associated the hosted VoIP PBX system 100. These groups represent three exemplary client device groups, Company One 115 group including client devices 115*a*-115*c*; Company Two 120 group including client devices 120*a*-120*c*; and Company Three 125 group including client devices 125*a*-125*f*, between which communications should be optimized by the hosted VoIP PBX 100. While it is conceivable that some groups might also be members of other groups, it is generally preferable that each client device group 115*a*-115*c*; 120*a*-120*c*; and 125*a*-125*f* be a member of one and only one primary device group 115, 120, 125 for optimization purposes.

The two-tier load balancing system 100 intercepts all communications associated with client devices 115*a*-120*f*, including outbound calls being initiated through the hosted VoIP PBX system 100 from the client devices 115*a*-120*f*, inbound calls passed by integrated carrier systems networks 110 to the hosted VoIP PBX system 100 that are directed to the client devices 115*a*-120*d*, and any other communications initiated to or from a client device 115*a*-120*f* via other actions such as a user clicking on a button in a user interface triggering an application event. The two-tier load balancing system 100 intercepts all communications and then is responsible for the routing of communications to a cluster 150, 160 and then to a specific node 151-155 or 160-164 within cluster 150 or 160 that is capable of handling the SIP or VoIP communication. In the case where defined resource usage limits for a client device 115*a*-125*f* or a device group 115, 120, 125 are exceeded, the two-tier load balancing system 100 is authorized to reject new communications. In the case where the original target cluster 150, 160 for a new communication is detected to have overload conditions or other quality problems, the two-tier load balancing system 100 can dynamically re-route communications to an alternate cluster.

FIG. 1 illustrates the first tier of load balancing, which can be referred to as device load balancing, and is handled by a device load balancer 130. This level of load balancing applies across multiple clusters 150, 160 of the hosted VoIP PBX system 100. Device load balancing by one or more device load balancers 130 can be implemented in software or hardware, using one or more physical or virtual machines. It requires network connectivity so that it can intercept incoming communication IP packets. The device load balancer 130 also inspects the data of incoming packets and employs a bridging and routing mechanism such as any that can be found in standard IP network routers, so that the device load balancer 130 is configured to route communications to other hosted VoIP PBX system resources according to its logic. The device load balancer 130 is in electronic communication with one or more data storage systems and devices within the hosted VoIP PBX system 100, wherein each of the storage systems and devices have unique device identifiers, such as a domain name system (DNS) address, SIP credentials, or a DID. The device load balancer 130 has the ability to route communications packets among the various devices and storage systems within the hosted VoIP PBX system 100, using the unique device identifiers (i.e. addresses) embedded within elements of the incoming communications. Also available from the data storage system is the mapping information for the device load balancer 130 to map the primary device groups 115, 120, 125 to each identified client device 115*a*-126*f*. Finally, the device load balancer 130 also can use a dynamic cache system in which it can store and lookup information about communications routing decisions, such as information about which device groups have been routed to which clusters, and the number of client devices that have been assigned to each cluster.

The device load balancer 130 is responsible for routing each new communication to a cluster 150, 160 of the hosted VoIP PBX system. The logic of the device load balancer 130 requires that all the communications to or from a single device group 115, 120, 125 be routed to the same cluster 150, 160 until and unless the second-tier call-load balancer 140 sends a distress signal (or similar communication or flag to the device load balancer 130) or an administrator takes action to clear and reset the device load balancer 130 which may result in new routing decisions and new assignments. The logic of the device load balancer is based on the assignment of device groups 115, 120, 125 and thereby the assignment of client devices 115*a*-125*f* to specific clusters 150, 160, and seeks to ensure that the total number of client devices 115*a*-125*f* assigned to each cluster 150, 160 should remain balanced according to configurable logic, prioritization, and optimization. A variety of fixed or dynamic balancing algorithms can be used to make new routing decisions. For example, a very basic system could include a set of fixed assignment rules that might be stored in a file or database. A more complex system could include fully dynamic algorithms, such as least-busy or round robin type protocol. In an exemplary embodiment, the balancing logic is fully independent of any logic in the client devices 115a-125f and can be configured, changed, and executed without changing any logic or configuration information in the client devices 115a-125f themselves.

Figure 2:
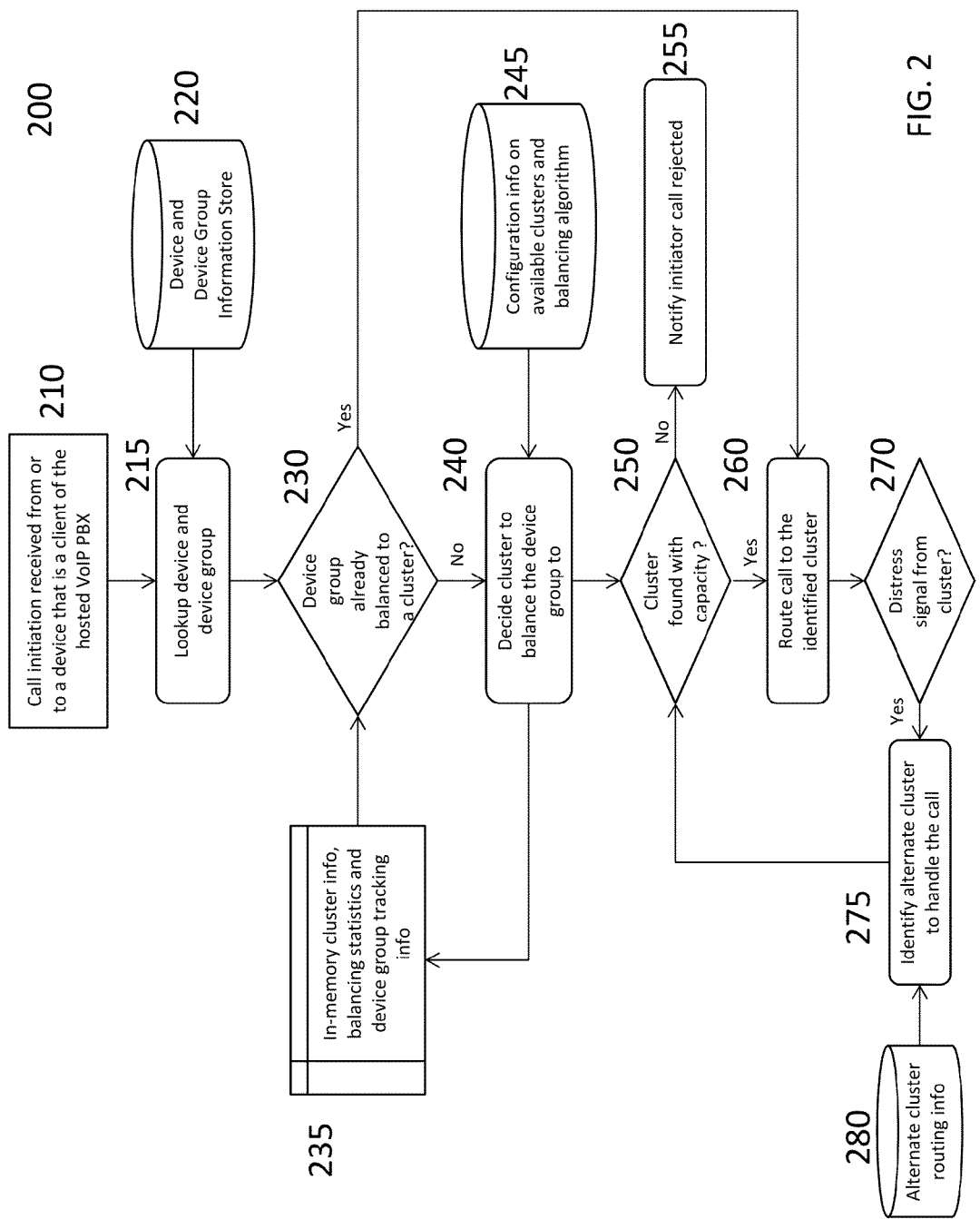
FIG. 2 is a flow diagram of an implementation of an exemplary device load balancing system.

Referring now to FIG. 2, a method 200 of device load balancing is illustrated. For example, when the device load balancer 130 intercepts a new communications sent to or from the hosted VoIP PBX by any means, including directly from client devices 115a-125f, or via integrated call carrier networks 110, or via other software applications through available integration gateways, the first step 210 is to pull known identifiers from the new communication request so that the call initiation is identified as being associated with the hosted VoIP PBX system. This may include a DNS address, SIP credentials, or a DID. Using the identifiers found in the new communication, at step 215, the device load balancer 130 subsequently performs lookups from an integrated storage system 220 such as a database or a key-based file store. In an embodiment, the storage mechanism of the integrated storage system is unspecified, but the stored data can be managed by a system administrator and preferably persists even when the device load balancer 130 is not operating. The device load balancer 130 uses the communication identifiers to look up a unique device indicator for the primary client device 115a-125f to which the new communication is directed. This device indicator uniquely identifies a primary client device 115a-125f among all those known and registered to the hosted VoIP PBX system. The primary client device 115a-125f may be either the initiator or the recipient of the communication, but it should be one or the other.

Further in step 215, having identified the primary client device associated with the new communication, the device load balancer 130 looks up the associated device group to which the primary client device belongs. This information can be retrieved from the integrated storage system in step 220. In the preferred embodiment, there is one and only one associated device group 115, 120, 125 found by the device load balancer 130. If the device load balancer 130 is unable to obtain the unique device indicator for the respective primary client device 115a-125f or the associated device group 115, 120, 125 associated with the new communication, the communication is rejected.

Still further in the flow diagram of FIGS. 1 and 2, having intercepted a new communication and having identified the primary client device 115a-125f and the associated device group 115, 120, 125 to which the new communication is directed, the method proceeds to step 230. At step 230 the device load balancer 130 attempts to determine the cluster 150, 160 to which the communication should be routed. To accomplish this, the device load balancer 130 performs a lookup of cluster and device group information from an integrated cache 235. As, explained above, the cache storage mechanism is unspecified and may be memory-based or disk-based or both so long as the stored information persists in memory preferably as long as the device load balancer 130 is running, unless or until it is restarted or refreshed by a system administrator. In step 230, the device load balancer 130 obtains the information about all the available clusters in order to make its load balancing decision and to complete the new communication routing for each cluster 150, 160 and primary client device identified from the cache 235. Therefore, if it is determined that the primary client device with which the call initiation is directed is already assigned to an associated group and to a cluster, the device load balancer 130 at step 230 routes the call to the identified cluster associated with primary client device at step 260. However, if it is found that the primary client device with which the call initiation is directed is not assigned to a cluster, the device load balancer at 230 will proceed to step 240.

At step 240, the device load balancer 130 identifies a cluster of computing resources 150, 160 to which, the primary client device can be assigned. The routing for each cluster may be based on any number of variables and balancing algorithms stored in storage mechanism 245. The algorithms stored in the storage mechanism 245 may consider factors, such as, for example, cluster capacity limits based on the maximum number of client devices that can be assigned to each cluster, the number of client devices already assigned to each cluster, and the network address information required to route new communications to each cluster. In a preferred embodiment, the device load balancer 130 can balance the number of client devices assigned to each cluster equally, up to the capacity limit of each cluster; however, various balancing, prioritization, and optimization techniques and algorithms may be used. The algorithms and the parameters required for load balancing may be configurable by a system administrator, and the algorithms used may or may not result in an equal distribution of the number of client devices 115a-125f assigned to each cluster. The device load balancer 130 can also consider dynamic metrics stored in the integrated cache 235 to determine to which cluster 150, 160 a new communication should be routed. The device load balancer 130 looks at the number of client devices 115a-125f that are the members of the primary device group 115, 120, 125 associated with the new communication. Once a balancing algorithm has been selected from the storage mechanism 245 and data has been gathered from the integrated cache 235 the device load balancer 130 assigns the device group 115, 120, 125 to a particular cluster 150, 160 based on this consideration in step 240. This cluster assignment information is updated in the cluster info cache 235. Once a device is assigned to a cluster, this is equivalent to assigning all the client devices 115a-115c; 120a-120c; 125a-125f in the device group 115, 120, 125, respectively, to the cluster 150, 160, whether those devices are currently active or not. For example, if a new communication is received from a client device 115a, and that client device is determined to be a member of a device group 115 that has 1-100 total client devices as members, then the device load balancer 130 will assign (if it has not previously done so) the device group 115 to a specific cluster 150 which is the equivalent of assigning 100 client devices to the cluster. The device load balancer 130 relies on the number of client devices in a device group 115, 120, 125 at the time it performs the load balancing and routing. The device load balancer 130 may or may not readjust at a later time if the number of client devices 115a-115c in a device group 115, for example, dynamically changes. These steps are designed to balance communications in a way that facilitates PBX optimizations for intra-group (e.g. device groups 115, 120, 125,) communications like call transfers and conference calls by directing all communications for each group to a specific cluster. The method then proceeds to step 250.

In step 250 the capacity of the cluster to which the client device is assigned is checked. If the cluster has capacity to take on the call, the call is routed to a node within the cluster in step 260 for processing. However, if the cluster does not have any additional capacity to handle calls or if there are other performance issues associated with the cluster, the call is rejected in accordance with step 255. Once the device load balancer 130 assigns a device group and thereby all its client devices 115*a*-125*f*, to a specific cluster it maintains that assignment and routes subsequent new communications to or from client devices 115*a*-125*f* in the device group to the same cluster unless or until the device load balancer 130 is changed, refreshed, or restarted by a system administrator. The method then proceeds to step 270.

In an embodiment, the target cluster 150, 160 to which a client device group is assigned will continue to handle new communications with client devices within the group unless or until it develops performance and/or capacity problems. In step 270 if the assigned cluster develops performance and/or capacity problems, it will send a distress signal (or other similar notification or flag) to the device load balancer 130 indicating that it can no longer currently handle new communication with sufficient reliability. The device load balancer 130 will look to identify an alternate cluster to handle the call for the device group. The device load balancer 130 can consult an alternative cluster routing map maintained on storage device 280. Once a cluster is identified, the method would proceed back to step 250.

As further shown in FIGS. 1 and 2, in the specific case at step 270, where the device load balancer 130 receives a distress signal or notification from a second tier call load balancer 140*a* for a specific cluster 150, 160, as described in more detail below, indicating that the original target cluster is unable to reliably handle a new communication sent to it by the device load balancer 130, the device load balancer 130 will attempt to redirect the communication to an alternate cluster 140*b*. The logic for searching and finding alternate clusters may be configured by a system administrator and may be looked up by the device load balancer 130 in the integrated storage system 280. The device load balancer 130 will attempt to redirect and reroute any communication for which it receives a distress signal from a cluster, up to the time that no cluster can be found to reliably handle the communication (unless the cluster subsequently sends or sets an "all clear" signal, notification, or flag, which indicates that the cluster is now able to retake and handle calls); at which point the device load balancer 130 will reject the communication and send an appropriate rejection signal to the communication initiator 255. In a preferred embodiment, upon receiving a distress signal from the second tier call load balancer for a specific cluster 150, 160, the device load balancer may or may not take further action to re-assign device groups 115, 120, 125 and client devices 115*a*-1125*f* previously assigned to the distressed cluster 150, 160 or to otherwise permanently or temporarily change the routing of new communications to the distressed cluster.

In a preferred embodiment, upon assigning a device group 115, 120, 125 to a specific cluster 150, 160, the device load balancer 130 may update the integrated cache 235 to reflect the assignment for future communications, and may also update other parameters in the integrated cache 235 used in load balancing decisions 240, such as the number of client devices assigned to each cluster 150, 160. The device load balancer 130 later, when determining how to balance 240 and route 260 new communications, can access this updated information in the integrated cache 235.

Having identified the cluster 150, 160 to which a new communication should be routed, the final step of the device load balancer 130 is to use the cluster's network routing information obtained from the integrated cache 235 to route the communication to the assigned cluster 150, 160 without requiring any manual intervention, extra steps or knowledge by any user of how the specific communication is being routed. This may be done by a variety of means, including but not limited to modifying network packet headers, creating new network packets and embedding communications data within it, or sending communications back to a client device or other source of communications causing the source to re-route communications to the target cluster. Once the new communication is established, any subsequent network packets will be automatically routed to the new cluster target without requiring the device load balancer 130 to perform the entire sequence of steps taken in FIG. 2 to initially route the new communication. Depending on the method of routing used, this can require that the device load balancer 130 also maintain a list of active communications and target cluster network routing information in a cache 235 to optimize the routing of subsequent network packets that are part of the communication stream.

Figure 3:
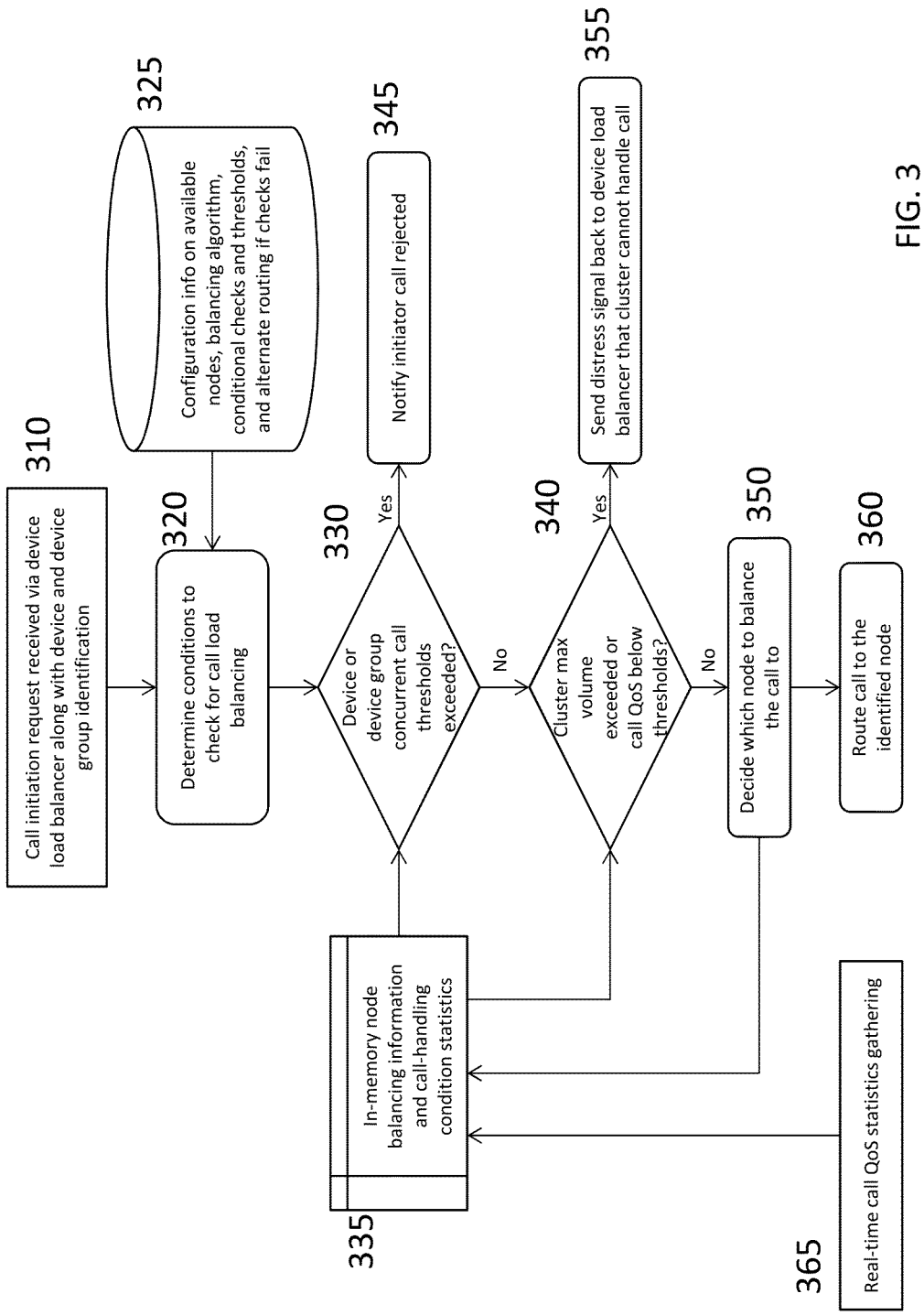
FIG. 3 is a flow diagram of an implementation of an exemplary call load balancing system.

Referring now to both FIGS. 1 and 3, with particular reference to FIG. 3, a second tier of load balancing is illustrated in what can be referred to as "call load balancing." This level of load balancing applies to a specific cluster 140*a*, *b* within the hosted VoIP PBX system. Call load balancing 140*a*, *b* can be implemented in software or hardware, using one or more physical or virtual machines. It requires (i) network connectivity so that it can intercept incoming communication IP packets and inspect their data, and (ii) a bridging and routing mechanism, such as any that can be found in standard IP network routers, so that the call load balancer 140*a*, *b* can route communications to specific nodes 151-155, 161-165 that are part of a given cluster 150, 160 within the hosted VoIP PBX system 100. It also requires a storage system where configuration information such as specific conditions, thresholds, and backup or overflow network routing paths can be stored and modified by system administrators. The call load balancer 140*a*, *b* also employs a dynamic cache system where it can store and lookup information about the current call load for the cluster 150, 160 as well as the call load for individual device groups 115, 120, 125, and for individual devices 115*a-c*, 120*a-c*, and 125*a-f*. The dynamic cache system can also store recent VoIP call audio quality metrics.

The call load balancer 140*a*, *b* provides quality of service checks and controls for the hosted VoIP PBX cluster 150, 160 to which it is assigned. Checks and thresholds can be configured at the client device 115*a*-125*f*, device group 115, 120, 125, or cluster level 150, 160. If the checks are not met, the call load balancer 140*a*, *b* can be configured to either reject new communications or to send a distress signal (or other similar notification or flag) back to the device load balancer 130 indicating that a new communication could not be handled reliably by the cluster 150, 160. The sending of the distress signal (or other similar notification or flag) allows the device load balancer 130 to redirect the communication to an alternate cluster 150, 160.

Further, as shown in FIGS. 1 and 3, a system administrator can configure the specific checks and thresholds for each quality of service check for a specific cluster. For example, the call load balancer 140*a*, *b* can be configured to make sure that client devices 115*a*-125*f* and device groups 115, 120, 125 are not consuming more than their system-allocated amount of computing resources and thereby threatening overall quality, which might be done by tracking the number of concurrent calls for each client device 115*a*-125*f* and device group 115, 120, 125 against configured thresholds. If call volume thresholds are exceeded for a client device 115*a*-125*f* or device group 115, 120, 125, new communications might be rejected 345 by sending an appropriate signal or notification back to the communication initiator. The call load balancer 140*a*, *b* can also be configured to make sure that the overall call volume on the cluster 150, 160 does not exceed an established threshold, and that the dynamically measured quality of recent calls is meeting the established threshold for sufficient quality, which can be done by tracking the total number of concurrent calls active in the cluster 150, 160 and by gathering the mean opinion score (MOS) for every active or recently completed call. Specific VoIP quality of service metrics like MOS scores might be gathered on the nodes themselves or by independent software or hardware systems or modules, and can be sent to the integrated cache of the call load balancer 140*a, b* from which the metrics can be retrieved and checked versus thresholds before routing new communications. These steps further allow improved reliability of VoIP call quality from a limited set of computing resources.

Turning now to FIG. 3, in step 310, a call initiation request is sent from the device load balancer 130 to the call load balancer 140*a, b* of the cluster to which the primary client device is assigned. When the call load balancer starts it proceeds to step 320, where it loads all configuration information required to carry out its functions from an integrated storage system 325. Next in step 320, the call load balancer checks the call load conditions on the cluster 150, 160 by considering configuration info and balancing algorithm stored on the storage system 325. The storage mechanism of the integrated storage system 325 is unspecified but the stored data is managed by a system administrator and must persist even when the call load balancer is not operating. The configuration information preferably includes the definition of the quality of service conditions to be checked for each new communication, thresholds for each condition, and actions to take if the thresholds are exceeded. The configuration information preferably also includes a definition of the load-balancing algorithm to use when directing new communications to specific nodes, such as round-robin or least busy. System administrators have the ability to modify the configuration information, as well as the ability to refresh the call load balancer 140*a, b* for the modified configuration information to take effect. The method then proceeds to step 330.

In step 330, if the quality of service thresholds are not met, then the call load balancer 140*a, b* is preferably configured to send a distress (or other notification) flag or signal 345 back to the device load balancer 130. The call load balancer 140*a, b* may also perform a lookup from an integrated cache 335 of any information it needs for processing a new communication, such as client device, device group, cluster and quality information. The cache storage mechanism 335 is unspecified and can be memory-based or disk-based or both. However, the stored information will persist as long as the call load balancer is operating, unless or until it is restarted or refreshed by a system administrator.

From the cache 335 the call load balancer also obtains information about all the available nodes 151-155 within the cluster and the network address information required to route new communications to each node. System administrators may change this node configuration data. The cache 335 may also contain summary information about all previous routing decisions made unless or until it is restarted or refreshed by a system administrator. This summary information may include previous routing assignments of communications to specific nodes 151-155, 161-165, or the total number of currently active calls for the entire cluster 150, 165 and for each client device 115*a*-125*f*, device group 115, 120, 125, and node 151-155, 161-165 within the cluster. The cache can dynamically maintain a record of minimum quality of service conditions comprising qualitative metrics including one or more of the following: communications quality measurements, volume, number of active calls per client device in the associated client device group, number of active calls per associated client device groups, number of active calls being handled by the selected specific cluster, and/or a voice quality metric such as a mean opinion score (MOS) for recent calls handled by the selected specific cluster. Call quality metrics can be obtained and updated into the cache 335 by a process integrated into the call load balancer 140*a, b* or by a separate process elsewhere, such as a software process running on each node 151-155 and 160-165 within the cluster 150, 160, or a network monitoring device capable of obtaining audio quality measurements when monitoring packets on the network. If the quality of service thresholds is operating within prescribed limits, the method proceeds to step 340.

In step 340, the call load balancer will consults the cache 335 to gather data regarding quality of service checks associated with an assigned cluster. If the quality of service checks being enforced by the call load balancer 140*a, b* are within prescribed limits for an assigned cluster, then the call load balancer 140*a, b* proceeds to step 350, where it can select a target node within the cluster to handle the new communication according to the call load balancer algorithm 325 for configuring and balancing communications on the available nodes 151-155, 161-165. In step 350, the call load balancer 140*a, b* will consider call quality statics maintained in the cache 335 when deciding the target node 151-155, 161-165, to which the new communication will be assigned.

Having identified 350 the target node 151-155, 161-165 to which a new communication should be routed, the call load balancer 140*a, b* will use the node's network routing information obtained from the integrated storage system 325 or integrated cache 335 to route the communication to the target node 151-155, 161-165. This may be done by a variety of means, including but not limited to modifying network packet headers, creating new network packets and embedding communications data within it, or sending communications back to the source of communications causing the source to re-route communications to the target node. Once a new communication is established, any subsequent network packets will be automatically routed to the new node 151-155, 161-165 target without requiring the call load balancer 140*a, b* to perform the entire sequence of steps taken to initially route the new communication. Depending on the method of routing used, this may require that the call load balancer 140*a, b* also maintain a list of active communications and target node network routing information in the integrated cache 335 to optimize the routing of subsequent network packets that are part of the communication stream.

Next, the call load balancer 140*a, b* will appropriately route the new communication to the identified target node in step 360. Once the new call is assigned to a node in step 360, then the call load balancer 140*a, b* may update the cache 335 to reflect the assignment for future communications and future load balancing decisions 350. Concurrently, while the new communication and future communications are in progress on the primary client device and target node, the call load balancer can concurrently gather call quality statistics at step 365. This data is stored dynamically in the cache 335.

Figure 4:
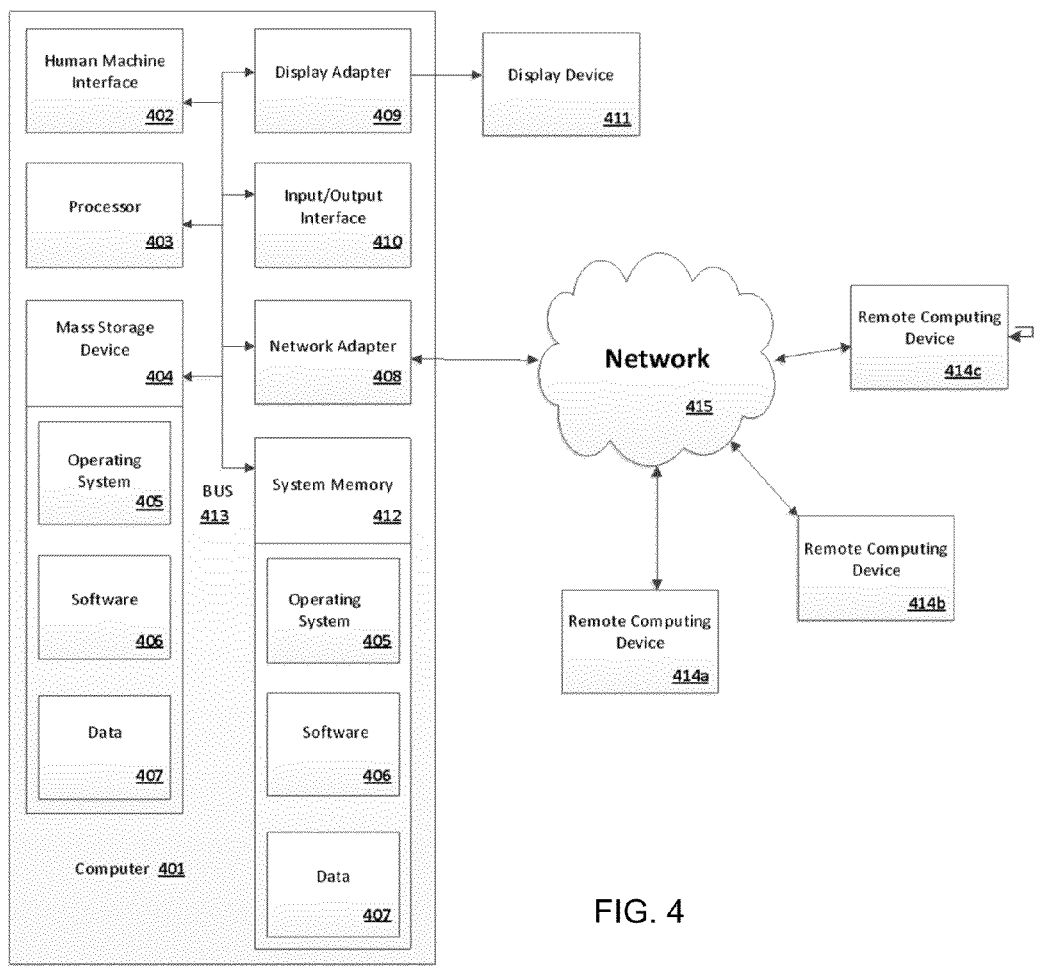
FIG. 4 is a block diagram of an exemplary computing environment that may be used in conjunction with example embodiments and aspects.

Turning now to FIG. 4, one skilled in the art will appreciate that the systems and methods disclosed herein can be implemented via a general-purpose computing device in the form a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, software 406, data 407, a network adapter 408, system memory 412, an input/output interface 410, a display adapter 409, a display device 411, a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, as well as, removable and non-removable media. The system memory 412 comprises computer readable media in the form of volatile memory, such as random access memory (RAM), and/or non-volatile memory, such as read only memory (ROM). They system memory 412 may contain data such as media, video, audio, or other data 407 and/or program modules such as operating system 405 and software 406 capable of manipulating, translating, transcoding, or otherwise editing the data 407 that are immediately accessible to and/or presently operated on the by the processing unit 403.

In another aspect, the computer 401 can also comprise other removable/non-removable, volatile/non-volatile computer storage media. By way of example, FIG. 4 illustrates a mass storage device 404, which can provide non-volatile storage of computer code, computer readable instructions, data structures, program modules and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and hosted VoIP PX software 406. Each of the operating system 404 and hosted VoIP PX software 406 (or some combination thereof) can comprise elements of the programming and the hosted VoIP PX software 406. Media, video, audio, or other data 407 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or a Microsoft Lync® server software.

In another aspect, the user can enter commands and information into the computer 401 via client device or an input device (not shown). Example of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but can be connected by other interface and bus structures, such as a parallel port, game port, and IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409, and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown), which can be connected to the computer 401 via input/output interface 410. Any step and/or result of the methods can be output in any form to an output device. Such output can be any form of visual representation, including but not limited to, textual, graphical, animation, audio, tactile, and the like. The display 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, softphone, client device, a server, a router, a network computer, a peer device or other common network node, and so on. Logical connections between the computer 401 and remote computing device 414a,b,c can be made via a network 415, such as a local area network (LAN) and or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of media manipulation software 406 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent system (e.g. Expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing two-tiered load balancing for a hosted voice-over Internet protocol (VoIP) private branch exchange (PBX), wherein the hosted VoIP PBX includes a plurality of VoIP-enabled client devices, comprising:
   identifying a specific client device group to which a client device belongs from among a plurality of client device groups;
   dynamically assigning a selected cluster of computing resources to the identified specific client device group based on prescribed conditions;
   identifying a specific client device group to which a primary client account is assigned in response to a communication activity with the primary client account, and identifying the selected cluster of computing resources assigned to the specific client device group to which the primary client account is assigned;
   routing the communication activity associated with the primary client account to the identified selected cluster of computing resources assigned to the specific client device group to which the primary client account is assigned; and
   dynamically determining if predefined conditions are currently being met within the identified selected cluster of computing resources; and
   if the predefined conditions are currently being met, establishing the communication activity associated with the primary client account with an available node within the selected cluster of computing resources.

2. The method of claim 1, wherein the prescribed conditions are based on (i) a maximum number of simultaneous electronic communications expected to and from the specific client device group and (ii) ability of the selected cluster to maintain a predefined minimum quality of service for each electronic communication expected to and from the specific client device group.

3. The method of claim 1, wherein the predefined conditions include (i) ensuring that a maximum number of simultaneous communications permitted for the specific client device group is not currently being exceeded and (ii) ensuring that minimum quality of service conditions being provided by the selected cluster of computing resources assigned to the specific client device group is currently being maintained.

4. The method according to claim 3, wherein the minimum quality of service conditions include at least one qualitative metric.

5. The method of claim 1, wherein each of the selected cluster of computing resources is configured for handling communications to and from the plurality of client devices.

6. The method of claim 1, wherein each specific client device group includes client devices logically associated with each other.

7. The method of claim 6, wherein client devices are logically associated with each other if the client devices belong to a set of users that frequently interact, that are part of a common business entity, that need to share similar PBX functionality, or that are physically proximate to each other.

8. The method according to claim 1, wherein the communication activities associated with the primary client account are routed and balanced among an identified selected cluster of computing resources that share the same logic and condition thresholds.

9. The method according to claim 1, wherein if the predefined conditions within the selected cluster of computing resources are not currently being met, then establishing the communication activity associated with the primary client account with an available computing resource selected from among a different selected cluster of computing resources.

10. The method according to claim 1, wherein if the predefined conditions within the selected cluster of computing resources are not currently being met, then providing an advisory message and terminating the communications activity.

11. A system for providing two-tiered load balancing for a hosted voice-over Internet protocol (VoIP) private branch exchange (PBX), comprising:
   a plurality of VoIP-enabled client devices in communication with the hosted VoIP PBX, wherein each client device is assigned to an associated client device group;
   a first data storage accessible by the hosted VoIP PBX that dynamically registers the associated client device group to which each of the plurality of client devices is assigned;
   a plurality of clusters of computing resources in communication with the hosted VoIP PBX, wherein each cluster of computing resources includes a plurality of server nodes, wherein each of the server nodes is configured to handle calls to and from the plurality of client devices in communication with the hosted VoIP PBX;
   at least one device load balancer in communication with the hosted VoIP PBX that is configured to assign each associated client device group to a specific one of the plurality of clusters of computing resources, wherein assignment of each associated client device group to a specific cluster among the plurality of clusters of computing resources by the at least one device load balancer is based on prescribed conditions;

a second data storage accessible by the hosted VoIP PBX that dynamically registers one or more nodes within the specific cluster of computing resources to which an associated primary client device within a client device group has been assigned; and at least one call load balancer for routing a call associated with the primary client device to a node within the specific cluster of computing resources assigned to the client device group with which the primary client device is assigned.

12. The system of claim 11, wherein the prescribed conditions that the at least one device load balancer uses to assign each associated client device group to the specific cluster is based on (i) a maximum number of simultaneous calls expected to and from the associated client device group and (ii) ability of the specific cluster to maintain a predefined minimum quality of service for each call expected to and from the associated client device group.

13. The system of claim 11, wherein the predefined conditions include:
  (i) ensuring that a maximum number of simultaneous calls permitted for the associated client device group is not currently being exceeded, and
  (ii) ensuring that minimum quality of service conditions being provided by the identified specific cluster of computing resources assigned to the associated client device group are currently being maintained.

14. The system according to claims 13, wherein the minimum quality of service conditions include at least one qualitative metric.

15. The system of claim 11, wherein each associated client device group includes client devices logically related to each other.

16. The system of claim 15, wherein client devices are logically related to each other if the client devices belong to a set of users that frequently interact, that are part of a common business entity, that need to share similar PBX functionality, or that are physically proximate to each other.

17. The system according to claim 11, wherein each of the one or more device load balancers in communication with the identified specific cluster of computing resources share the same logic and condition thresholds.

18. The system according to claim 11, wherein if the predefined conditions within the identified specific cluster of computing resources are not currently being met, then establishing the call request associated with the primary client device with a new and different node within a the plurality of clusters of computing resources.

19. The system according to claim 11, wherein if the predefined conditions within the identified specific cluster of computing resources are not currently being met, then providing an advisory message and terminating the call request.

20. A two-tier load balancing system for a server-based voice-over Internet protocol (VoIP) private branch exchange (PBX), comprising:
  a plurality of VoIP-enabled client devices in communication with the VoIP PBX, wherein each of the plurality of client devices are assigned to an associated client device group based on a logical relationship among the plurality of client devices assigned to the associated client device group;
  a plurality of clusters of computing resources in communication with the VoIP PBX, wherein each cluster of computing resources is configured to handle calls to and from the-plurality of client devices within an associated client device group;
  a device load balancer for balancing one or more associated client device groups among the plurality of clusters of computing resources, and;
  a call load-balancer for dynamically to monitoring current conditions and thresholds within the cluster of computing resources to determine whether certain predefined conditions are being met, and wherein the call load balancer dynamically assigns any future communications to a respective one of a plurality of server nodes within the selected specific cluster of computing resources based on the current conditions and thresholds of the respective one of the plurality of server nodes.

21. The system of claim 20, wherein the prescribed conditions that the call load balancer uses to assign a respective one of the associated client device groups to the respective one of the plurality of server nodes is based on (i) a maximum number of simultaneous calls expected to and from the respective one of the associated client device groups and (ii) ability of the respective one of the plurality of server nodes to maintain a predefined minimum quality of service for each call expected to and from the respective one of the associated client device groups.

22. The system of claim 20, wherein the certain predefined conditions include:
  (i) ensuring that a maximum number of simultaneous calls permitted for the respective one of the associated client device groups is not being exceeded, and
  (ii) ensuring that minimum quality of service conditions being provided by the selected specific cluster of servers assigned to the associated client device groups is being maintained.

23. The system according to claims 22, wherein the minimum quality of service conditions include at least one qualitative metric.

24. A method for establishing electronic communications in a hosted voice-over Internet protocol (VoIP) private branch exchange (PBX), wherein the VoIP PBX includes a plurality of VoIP-enabled client devices, comprising the steps of:
  assigning each of the plurality of client devices to a respective client device group, wherein the client devices in each of the respective client device groups are logically related with each other;
  dynamically assigning each respective client device group to a preselected cluster of computing resources, configured to handle electronic communications with the plurality of client devices, and wherein assignment of a specific client device group to a specific preselected cluster of computing resources is based on a set of predefined conditions selected for the specific client device group;
  identifying the specific client device group with which the primary client device is assigned in response to a specific electronic communication request with a primary client device from the plurality of client devices and then identifying the specific preselected cluster assigned to the specific client device group with which the primary client device is assigned;
  routing the specific electronic communication associated with the primary client device to the identified specific preselected cluster;
  dynamically determining if predefined conditions are currently being met within the identified specific preselected cluster; and if the predefined conditions are currently being met, then establishing the electronic communication request associated with the primary client device with the identified specific preselected cluster.

25. The method according to claim 24, wherein the minimum quality of service conditions include at least one qualitative metric.

26. The method of claim 24, wherein client devices are logically related with each other if the client devices belong to a set of users that frequently interact, that are part of a common business entity, that need to share similar PBX functionality, or that are physically proximate to each other.

27. The method according to claim 24, wherein if the predefined conditions are not currently being met by the identified specific preselected cluster, then establishing the communication request associated with the primary client device with an available server node within a different one of the plurality of clusters.

28. The method according to claim 24, wherein if the predefined conditions are not currently being met by the identified specific preselected cluster, then providing an advisory message and terminating the electronic communication request.

* * * * *